United States Patent [19]
Spahr et al.

[11] Patent Number: 5,325,287
[45] Date of Patent: Jun. 28, 1994

[54] DECOUPLED DISPLAY AND CONTROL SYSTEM

[75] Inventors: David K. Spahr, Roscoe; Dennis Tibbitts, Rockford, both of Ill.

[73] Assignee: The Foxboro Company, Foxboro, Mass.

[21] Appl. No.: 954,330

[22] Filed: Sep. 30, 1992

[51] Int. Cl.⁵ .......................................... G06F 15/46
[52] U.S. Cl. .................................. 364/146; 364/188; 364/476
[58] Field of Search .......................... 364/131–134, 364/146, 147, 148, 141, 188, 189, DIG. 1 MS File, DIG. 2 MS File, 473, 476; 395/200, 275, 325

[56] References Cited

U.S. PATENT DOCUMENTS

| | | | |
|---|---|---|---|
| 4,251,858 | 2/1981 | Cambigue et al. | 364/132 |
| 4,418,381 | 11/1983 | Molusis et al. | 364/131 |
| 5,122,948 | 6/1992 | Zapolin | 364/131 |
| 5,164,895 | 11/1992 | Lunz et al. | 364/131 X |

OTHER PUBLICATIONS

Barber–Colman pamphlet entitled "MACO 8000—The Modular Distributed Control System", dated Jul. 1985.
Barber–Colman brochure entitled "MACO 8000—Modular Distributed Control For Plastics Processing", dated Apr. 1984.
Barber–Colman brochure entitled "MACO 8000—Data Bus Specification and Communication Protocol Standard", dated Feb. 1983.

*Primary Examiner*—Joseph Ruggiero
*Attorney, Agent, or Firm*—Leydig, Voit & Mayer, Ltd.

[57] ABSTRACT

A control system for a process machine, preferably an injection molding machine, and having an improved control system architecture. The system includes a machine controller which is coupled to and drives the machine and a separate display/operator interface. Both of the units are independently processor driven and function in a decoupled fashion. A communication bus links the display/operator interface and the machine controller, and standardized messages are communicated bidirectionally on the bus. By means of that sole linkage, the machine controller is utilized to drive the machine while the display/operator interface emulates a tightly coupled control panel, but operates independently, except for the communication of messages on the data bus. Preferably, a power supply for the display/operator interface is mounted in the machine controller enclosure and coupled to the interface by a power supply cable. The interface can thus be reduced in size, sealed and non-ventilated to allow for mounting the relatively hostile environment expected around an injection molding machine.

18 Claims, 8 Drawing Sheets

DECOUPLED DISPLAY AND CONTROL SYSTEM

FIELD OF THE INVENTION

This invention relates to control systems, and more particularly to a system having a display/operator interface, a separate machine controller, and a communication link therebetween which fully decouples the display controller and machine controller.

BACKGROUND OF THE INVENTION

The art has developed various forms of computerized control for industrial process machinery, such as computerized controls for injection molding machines. The injection molding process presents a useful environment for describing the present invention for at least two reasons. First, injection molding represents the preferred application of the invention. Secondly, the injection molding industry is characterized by numerous types of equipment having various parameters which can be monitored and controlled, all according to numerous recipes characteristic to individual machine users. The control system in that type of environment must be adaptable, on the one hand, to the numerous kinds of machines with which the control is apt to be used, and on the other hand, with the desires and needs of the operator in setting and adjusting the parameters according to his unique recipes.

The invention is generally applicable to control of process machines requiring relatively complex machine/operator interfaces with displays, and is especially useful in process machines and control systems which utilize multiple set points and sensed points operated according to particularized recipes relating to different applications (e.g., for forming different types of parts). In addition to injection molding, the invention will find particular applicability in the blow molding and extrusion arts. Other suitable applications will occur to the person of skill in the art upon reading of the following specification.

A relatively conventional approach to controlling a process machine such as an injection molding machine is to provide a machine controller and display/operator interface which are not only compatible with each other but which are designed to be interdependent. The operator display panel, which may or may not be in the same enclosure as the machine controller, utilizes at least some of the intelligence of the controller in performing its display function and interfacing between the machine operator and the machine itself. Thus, whenever the controller supplier intends to update or upgrade the machine controller, that task usually also involves the modification of the display to accommodate the compatibility requirements between the two.

Conceptually, it would be possible to configure a machine controller which could communicate to a self-contained unit such as a personal computer, with the operator interface accomplished primarily by interaction between the operator and the programs resident in the personal computer. It might then be possible to transfer information from the PC to the machine controller so that the machine controller can then drive the machine. That, however, is in the nature of an off-line type of approach where the PC might assist the operator in setting up recipes, but the PC is generally off-line insofar as continued running of the machine is concerned.

In the more conventional configuration, where the display panel utilizes the intelligence of the machine controller processor, problems can develop with display response time and the like because the processor, in addition to controlling the display and interfacing with the operator, must of course control the machine itself. Even in the case where a display unit includes its own processor, the processor must typically interact with the control system at the machine controller in order to perform its function, and that reduces response time, complicates the control, and gives rise to the coupled nature of the two elements of the control system which require that they be designed and modified as a unit.

SUMMARY OF THE INVENTION

In view of the foregoing, it is a general aim of the present invention to provide a control system with machine controller and display/operator interface in which the two units are decoupled to the greatest extent possible.

Thus, it is an object of the present invention to provide a system in which the display/operator interface has its own on-board processor capable of performing all interface functions for the operator but which functions, insofar as the operator is aware, as an element of the machine control system.

Conversely, it is also an object of the present invention to provide a control system in which communication between the display/operator interface and machine controller is standardized and simplified such that to the systems engineer or designer, the units are virtually completely independent and can be designed, configured and updated as separate entities.

According to a specific aspect of the invention, it is an object to provide a display/operator interface for a machine controller in which the display is configured so that it can be completely sealed, requires no ventilation, and can be mounted on the machine in a relatively hostile environment.

According to another specific aspect of the invention, it is an object to provide for input of recipes to such a control system in which the recipe input is accomplished utilizing the operator display/interface independently of the machine controller, and in which communication to the machine controller occurs in such a way that the setpoints and control parameters resulting from the recipe are communicated to the controller for, operation of the machine. In that respect, it is a specific object to make the communication of setpoints and control parameters relatively independent of the particular machine such that the same parts can be made from substantially the same recipe on different machines without alteration of the recipe itself.

A further specific object of the invention is to configure an operator interface/display controller and machine controller in a decoupled fashion such that multiple displays can be utilized in connection with a single machine control, or conversely, a single display/operator interface can interface with multiple machine controllers to control multiple machines.

It is a feature of the invention that separate processor controllers are provided for the injection molding machine and the display/operator interface, and the processors in the respective controllers are decoupled to the greatest extent possible, being linked only by standardized data messages on a communication link joining the two. Thus, an advantage of the invention is the fact that the processors in the display/operator interface and machine controller can be designed, updated and redesigned relatively independently so long as the respective designers take account of the standardized data messages which link the two.

The standardized communication messages are bidirectional, and the messages include not only the actual data which represents setpoints or other operating parameters for the machine, but also function ID's by which both the processors in the display controller and the machine controller can identify the parameter associated with the data. Thus, the communication link provides the ability for the display/operator interface to send messages to the machine controller for operating the injection molding machine. Conversely, the communication link also provides the ability for the machine controller to sense conditions in the injection molding machine and transmit actual sensed data to the operator/display interface for display of actual machine operating parameters.

It is a further feature of the invention that multiple displays can be used to control the same machine. By virtue of utilizing unique identification codes for each element in the system, including each controller and each display, in the two display situation, the displays can be configured to operate in a master/slave mode in which all changes from the master are displayed on both displays, and the slave is activated as a master only in certain limited conditions. A further mode of operation is also possible in which the two displays function independently of each other to drive the same machine. In that case, control commands from both displays are accepted by the machine controller, and the displays of both machines are updated to the actual machine conditions. As a further feature of flexibility, by virtue of specific identification codes for different machines, a given display can be utilized to control a plurality of machines (each with their own machine controller), with the communication between the display and a particular machine being controlled by the appropriate functional ID for the machine in question.

A further operating feature of the invention is the fact that the power supply for the display/operator interface is located remotely, preferably with the machine controller, and coupled to the enclosure housing the display/operator interface by a cable. Thus, the display/operator interface can be mounted in a sealed, non-ventilated enclosure, which is relatively flat and compact, and suitable for mounting in the potentially hostile environment directly on the injection molding machine.

Thus, in accordance with the invention, there is provided a display and control architecture for a process machine. The architecture includes a machine controller and a display/operator interface. The machine controller is configured to control operating parameters of the process machine and thus includes outputs connected to the machine for control thereof. The machine controller also has a processor having a data bus, a communication bus, and a data handler for controlling the passage of data between the respective buses. The display/operator interface is mounted in a separate enclosure and includes a display, a keyboard and a display processor. A program for the display processor renders the display/operator interface operative to provide: (a) input of parameters for control of the machine, (b) display of such input parameters, and (c) display of operating parameters sensed from the machine. A communication link couples a communication bus in the display processor with the communication bus in the machine control processor and comprises the only means of communicating data between the two. The communication link carries standardized data messages having a predetermined format recognizable by the display processor and the machine controller processor, and allows decoupling of such processors for independent operation but for communication using messages on the communication link.

Other objects and advantages will become apparent from the following detailed description when taken in conjunction with the drawings, in which:

DETAILED DESCRIPTION OF THE PREFERRED EMBODIMENTS

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Figure 1:
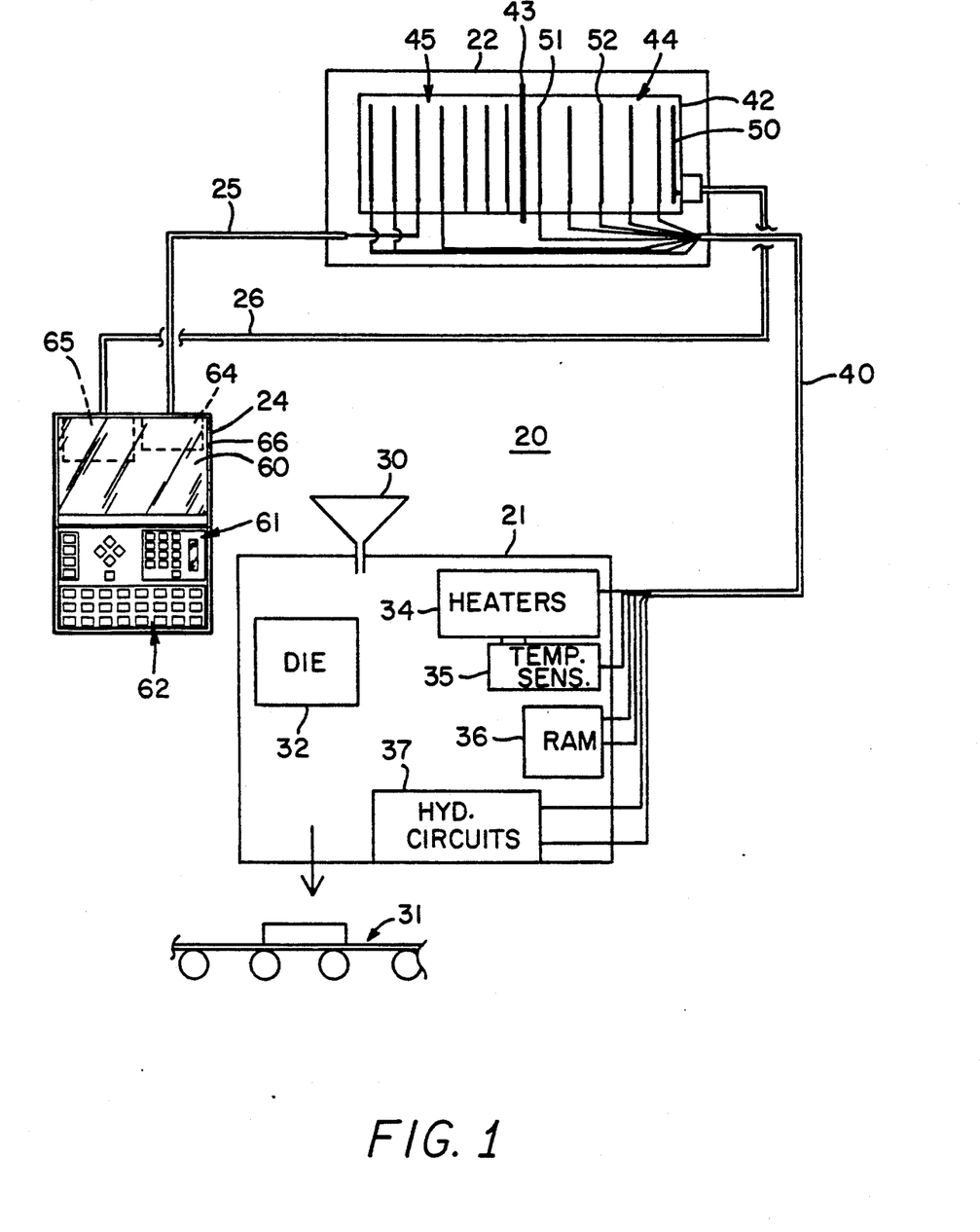
FIG. 1 is a block diagram illustrating a system exemplifying the present invention.

Turning now to the drawings, FIG. 1 shows, in global block diagram form, a machine controller and display/operator interface exemplifying the present invention. The invention will be described in connection with an injection molding machine, as being the preferred implementation of the more generically described process machine referred to in the specification and appended claims. The system architecture is generally illustrated at 20 and includes an injection molding machine 21, a machine controller 22 for operating the machine 21, and an operator interface 24. A communication link 25 and a power cable 26 interconnect the interface 24 and the machine controller 22. With the exception of those links, the interface 24 and machine controller 22 can be considered to be decoupled to the maximum extent. By decoupled is meant the fact that the controllers 22, 24 operate independently according to their own program, with all of the interaction between the units being accomplished by way of standardized messages sent on the communication bus 25. This provides the important benefit of allowing the units to be designed or upgraded separately so that if the system designer perceives a need, for example, to advance the state of the art with respect to its controller, it can focus its energy on the controller and need not, at that time, alter the operator interface, if the interface is believed to be current state of the art.

The injection molding machine 21 is illustrated only schematically, and includes a schematic illustration of a hopper 30 which supplies an entry point for raw materials and an output conveyor 31 which forms the exit point for molded parts. A die for forming the parts is illustrated schematically at 32. As is well-known, the injection molding machine includes screws or extruders for mixing the plastic material, heaters for maintaining its temperature, hydraulic circuits for driving a ram which causes the injection of the molten plastic parts into the die, additional hydraulic circuits for opening the mold, and the like. The die 32 in the illustration represents the mechanical components. Element 34 represents the heaters which are energized to maintain the material at the appropriate temperature. Block 35 represents temperature sensors inserted at appropriate points so that the system can monitor the temperature of the material. The ram is schematically illustrated at 36 and element 37 is symbolic of other control functions such as the hydraulic circuits, and represents both outputs from the machine controller as well as sensed inputs which can be used for feedback control.

A cable 40 connects the injection molding machine to the machine controller 22. The machine controller 22, in the illustrated embodiment, includes a rack 42 for holding a series of printed circuit cards. In the illustrated embodiment, a divider 43 separates a high voltage side 44 from a low voltage side 45.

Mounted in the high voltage side is a power supply board 50 which accepts line voltage and converts it to DC voltages useful in the remainder of the system. Other high voltage boards can include high voltage outputs such as heater output circuits 51, high voltage inputs 52, and others. The high voltage circuits include input and output circuitry such as relays or power drivers which drive the heaters or solenoids or accept input from hydraulic controls and other elements on the injection molding machine 21. The low power circuitry 45 within the machine controller 22 include such devices as circuitry for temperature sensors, position sensors, analog outputs from the hydraulic control, and digital circuitry. Temperature sensor circuitry is responsive to the elements 35 on the injection molding machine for providing an internal signal relating to the temperature of certain sensed points. Analog inputs can be used to sense ram position and other machine parameters. The signals in the controller 22, be they low power input signals or the data which creates high power output signals, are exchanged by a processor within the controller 22 (as will be described in greater detail below). Suffice it to say for the moment that the cable 40 which couples the machine controller 22 to the machine 21 carries the drive signals for the injection molding machine and the sensed signals from the machine, and all of the functionality of the injection molding machine 21 can be controlled by appropriate signals processed in the machine controller 22.

In accordance with the invention, the display controller 24 is also independently driven, but interfaces with the machine controller 22 by way of the data bus 25. As will be described in greater detail below, the machine controller 22 includes both a data bus (for processing the signals which drive the machine), and a communication bus to which a communication link 25 is connected. Similarly, a processor within the interface 24 is coupled to the communication link 25 and serves to impose signals on the link or extract signals from the link for communication with the machine controller 22.

The display/operator interface 24, as shown in FIG. 1, includes a flat panel display 60, a program keypad 61, and a machine control keypad 62. The communication link 25 is shown schematically as being connected to electronic circuit board 64 which contains the processor, display driver, and the like. The power connection 26 is connected within the display/operator interface 24 to a power supply interface 65, preferably in the form of a voltage regulator. The power supply card 42 within the machine controller can output power on the bus 26 which is slightly higher than needed by the display, and the regulator 65 can regulate that power to the levels required by the display elements and other electronics. The display/operator interface 24 is preferably housed within a cabinet 66 which is sealed and non-ventilated, the cabinet being adapted for mounting in the potentially hostile environment associated with the injection molding machine 21.

Figure 2:
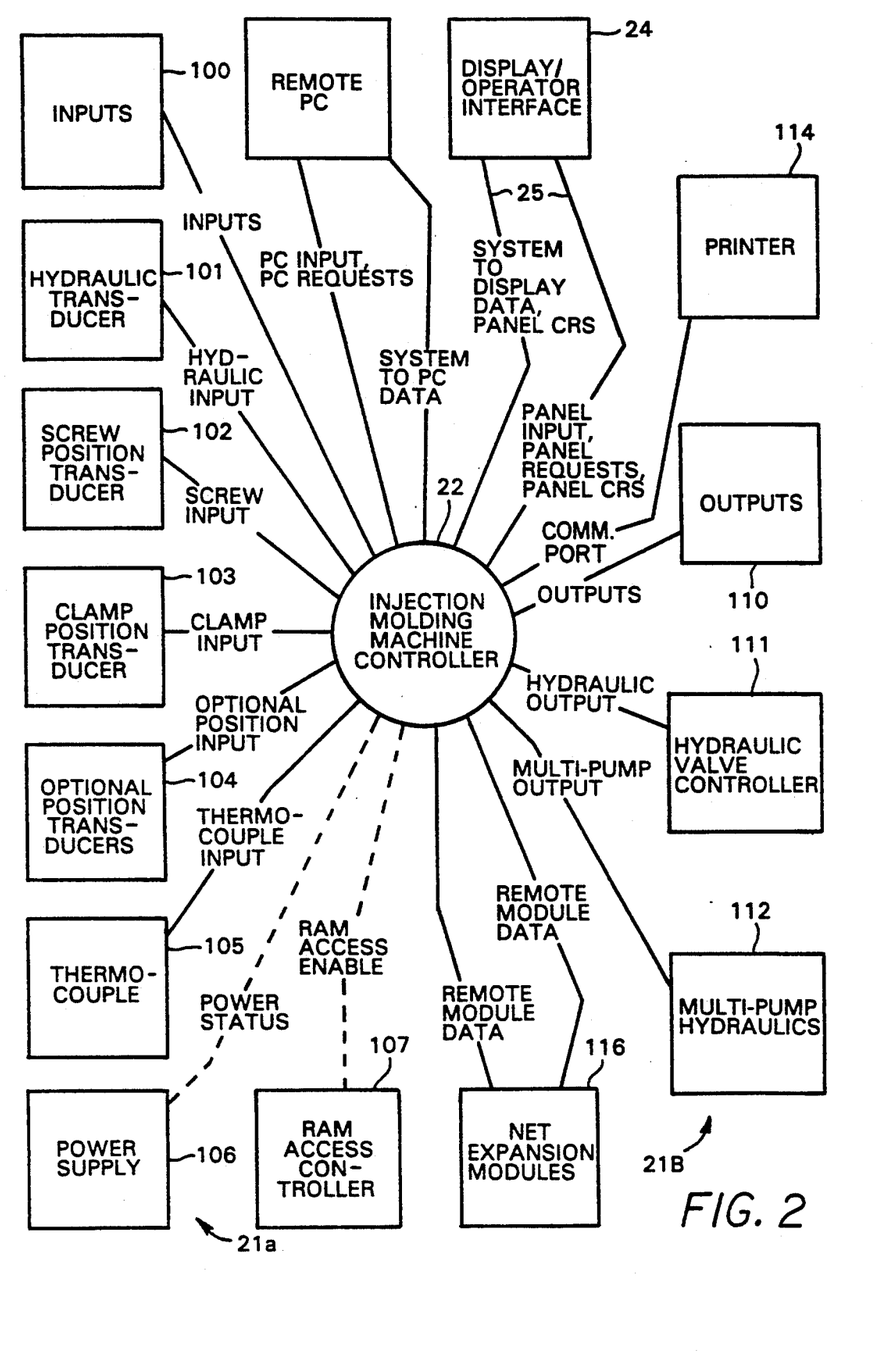
FIG. 2 is a diagram illustrating the relationship between the machine controller, the machine and the operator/display interface.

FIG. 2 is also a system block diagram which shows the relationship between the elements of FIG. 1 but with additional emphasis on the sensing and control aspects exercised by controller over the injection molding machine. Thus, in FIG. 2, the injection molding machine controller 22 is shown at the hub of an array which includes a plurality of machine elements or functions indicated generally at 21a, 21b, the display/operator interface at 24, and additional peripheral elements which will be discussed below.

At the left of a diagram (FIG. 2) are multiple inputs 21a which sense various points on the injection molding machine and are inputs to the control system. Inputs, for example, can represent safeties, temperature, position sensors and hydraulic transducers, etc. A hydraulic transducer 101 provides a signal that represents the hydraulic pressure for the injection cylinder, clamp tonnage or cavity pressure. The position of the screw is represented by element 102. Thermocouple inputs which are used to measure the barrel temperatures, etc. are represented by element 105. The power supply 106 provides several signals to the control system including power supply monitoring and power down anticipation.

A plurality of machine outputs 21b are indicated at the right of FIG. 2 including DC outputs 110 which represent DC signals, such as those which might be used to drive heaters for control of the temperature of the plastic material before injection. A hydraulic valve controller 111 is driven by a hydraulic control output from the control system, and multiple hydraulic pumps represented by the block 112 are also responsive to the machine control. The pumps can be driven in various groups to provide the pumping capacity needed to mold a particular part.

The display/operator interface is indicated at 24, and the lines 25 represent the bidirectional data bus which in one direction provide data from the machine controller to the interface, and in the other from the interface to the controller. An optional printer 114 is available which can be driven to print out information, such as screens from the display. Finally, a network expansion module 116 can be configured with the system for exchanging information with other similar controllers on a network, or for sending information upstream to a comprehensive factory automation system. Thus, the network expansion module 116 can receive information from other equipment which is networked to it, and pass data to the controller in response thereto. Similarly, remote data can be generated by the machine controller 22 and passed to the network expansion module for communication along a network, such as for reporting the status of the system.

It is worthy of note that there are a number of relatively high power outputs which can be AC or DC, and which are controlled for various periods of time, at various duty cycles, and the like, A number of different conditions are sensed as represented by the input elements at the left of FIG. 2. Thus, it will be appreciated that a data bus within the process machine controller 22 has the capacity for a substantial amount of traffic represented by a substantial number of different types of input and output information. Furthermore, the output information can be complex. For example, for the heater controls, it may be necessary to adjust power by duty cycle control of pulse width modulated waveforms supplied to the heater, and to adjust proportionality of the control as the temperature measured by the input devices reaches the setpoint temperature established by the recipe. That type of control can be in progress over a period of time while parts are being continually molded by operation of the ram, while the system controls the speed of the screw, and other factors.

FIG. 2 represents a generic control for an injection molding machine, and is intended to illustrate the types of devices which serve as inputs and outputs. Particular machines obviously have different input and output devices, different numbers of such devices, and the like. Recipes have been developed in the industry over time for manufacture of particular parts from particular materials using particular machines. As will be described below, it is one of the benefits of the invention that recipes are easily programmed into the display controller 24 for passage to the machine controller which thereupon deals with the particular signals which must be sensed from the input devices 21a and the particular signals which must be sent to the output devices 21b in response to the recipe parameters which are probably not written in terms of the specific input and output devices. Thus, as will become more apparent, it is possible according to the invention to take a recipe which is functional on one type of machine and transfer it to a similar controller but operating a different type of machine and successfully produce parts on the second machine as they had been manufactured on the first machine. The operator using the recipe and display panel interface needs to know the key parameters insofar as they relate to the recipe, and the recipe is then processed to produce electronic messages conveyed along communication link 25 to the machine controller 22 which thereupon deciphers the recipe to decide on which sensors should be read for what type of information, which output elements should be controlled to match which setpoints, where the alarm limits should be located, and all other factors necessary for operating the particular machine to produce the more generalized recipe specified by the operator.

Figure 3:
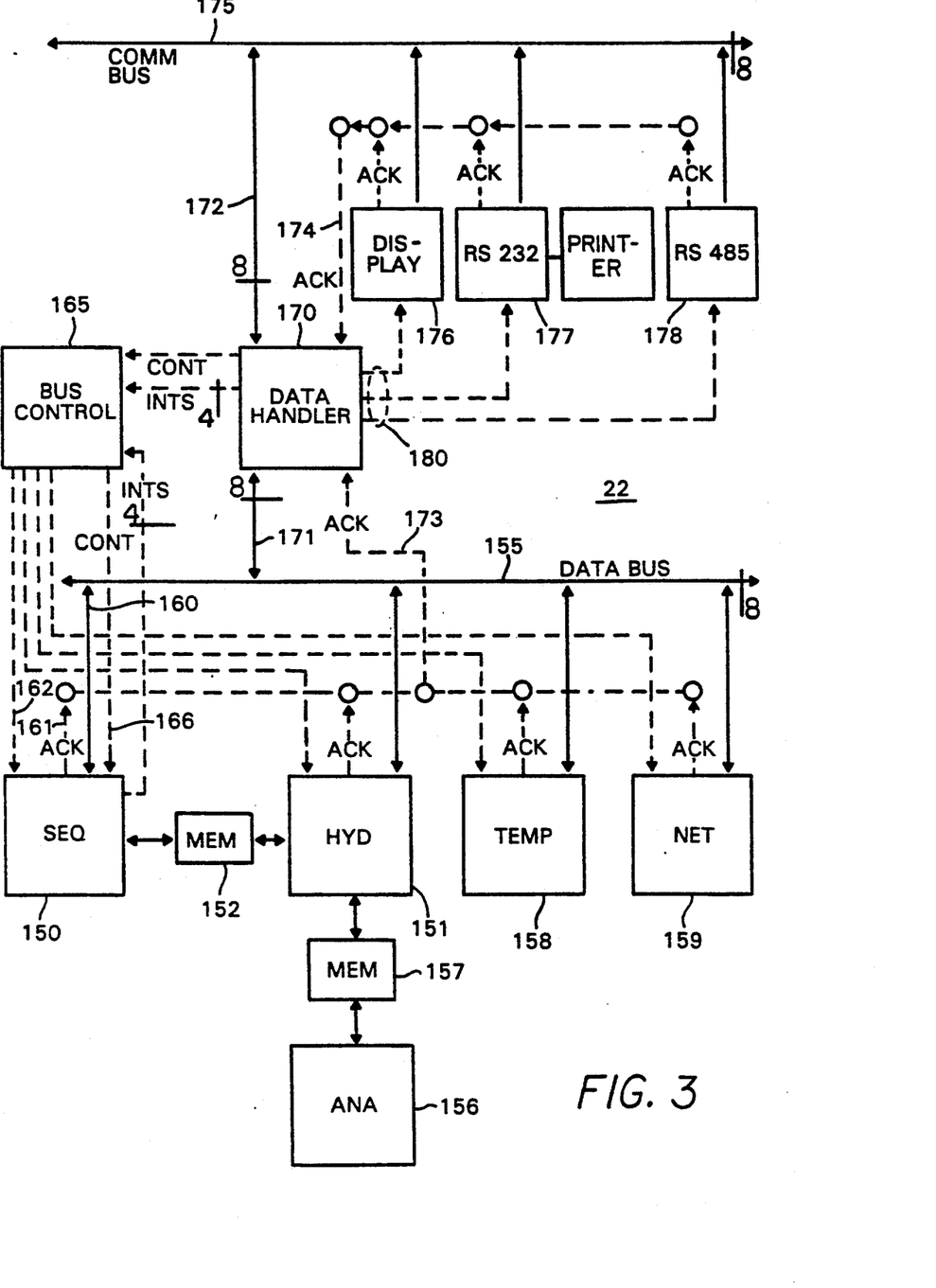
FIG. 3 is a block diagram relating primarily to the communication interfaces for the machine controller.

FIG. 3 illustrates the major modules of the machine controller 22, and the bus structure thereof which has a separate data bus and communication bus. The data bus is utilized for internal transfer of information within the controller among the modules thereof, and the communication bus for transfer of information to other connected devices, such as the operator interface 24.

Turning to FIG. 3, the controller 22 is illustrated generally and includes a sequence control module 150 which has memory for storing detailed programs of sequence steps and outputting information in appropriate time locations for control of the injection molding machine. A hydraulic controller 151 operates in conjunction with the sequence controller 150 to operate the hydraulic elements, such as the ram pressure and the like. A dual port memory 152 acts to communicate important data directly between the sequence control module 150 and the hydraulic control module 151. Other communication is by way of associated data lines connected to an internal data bus 155.

As noted previously, an analog module is provided, and is shown in FIG. 3 as block 156. The analog module senses analog inputs from the injection molding machine and, after digitizing that information, communicates it via dual port memory 157 to the hydraulic controller 151. Thus, the analog module 156 can, for example, sense the position or movement of the ram and communicate ram position via dual port memory 157 to the hydraulic controller 151 for feedback of the desired ram position.

Temperature sensing and control were also mentioned previously and are illustrated in the block diagram of FIG. 3 by the block 158. The module 158 allows for the input of temperature information from the injection molding machine, such as by way of thermocouples, and the output of information to affect temperature, such as control of heaters. A network control module 159 is also provided for communicating data from the data bus to other networked controllers.

The modules 150, 151, 158 and 159 are all similar, and the basic structure will be further described in connection with the sequence control module 150. It is seen that that module has a set of data lines 160 connected to the data bus 155. Similarly, the module has an acknowledge input 161 by which it signals to other connected circuitry that a requested action has been performed. Each of the modules also has an enable input 162 which serves to enable that module for communication with the data bus 155. It is seen that a bus control module 165 is provided having an output for each of the modules 150, 151, 158, 159 so that the modules can be individually and selectively enabled. The sequence control module 150 has an additional input 166 from the bus control module 165 and is a primary control input which allows the sequencer 150 to take precedence over other ones of the modules. Thus, the bus control module 165 operating in conjunction with the lower modules of FIG. 3 will serve to allow the input or output of information between the modules onto the data bus 155 so that information can be exchanged for driving the connected injection molding machine.

In practicing the invention, a data handler module 170 is provided which is coupled to both the data bus 155 and a communication bus 175. The data handler 170 controls the flow of information between the data bus 155 and the communication bus 175, and thus controls the flow of information to the display, illustrated in FIG. 3 as block 176. Thus, the data handler has a first set of data lines 171 which are connected to the data bus 155, and a second set of data lines 172 which are connected to the communication bus 175. Acknowledge inputs 173, 174 allow the passing of control to and from the data handler and the other devices. It is seen that each of the communicating devices including the display 176, an RS 232 port 177, and an RS 485 port 178 all have similar acknowledge lines and are all also connected directly to the communication bus 175. The data handler finally has a group of control outputs 180 which are connected in turn to the display 176, RS 232 interface 177, and RS 485 interface 178 for individually enabling those devices.

Thus, when it is desired for the data handler to display a process temperature on a graph in the display, the temperature is initially sensed by the temperature control module 158, digitized, and, when requested by the display, the digital information is imposed on the data bus 155. At the appropriate time, the data handler 170 calls up that temperature information and transfers that information by way of data lines 171 and 172 to the communication bus 175. The display communication interface 176 is then signalled via the appropriate control line 180, and the information on the communication bus 175 transferred to the display communication interface 176 for transmission on the communication link 25 to the display/operator interface 24 (FIG. 1). The unit 24 has its own processor which, as will be described below, interprets the information as a sensed temperature for a given point in the injection molding machine, and having so interpreted it, drives the display to show the sensed temperature at the appropriate point.

Figure 4:
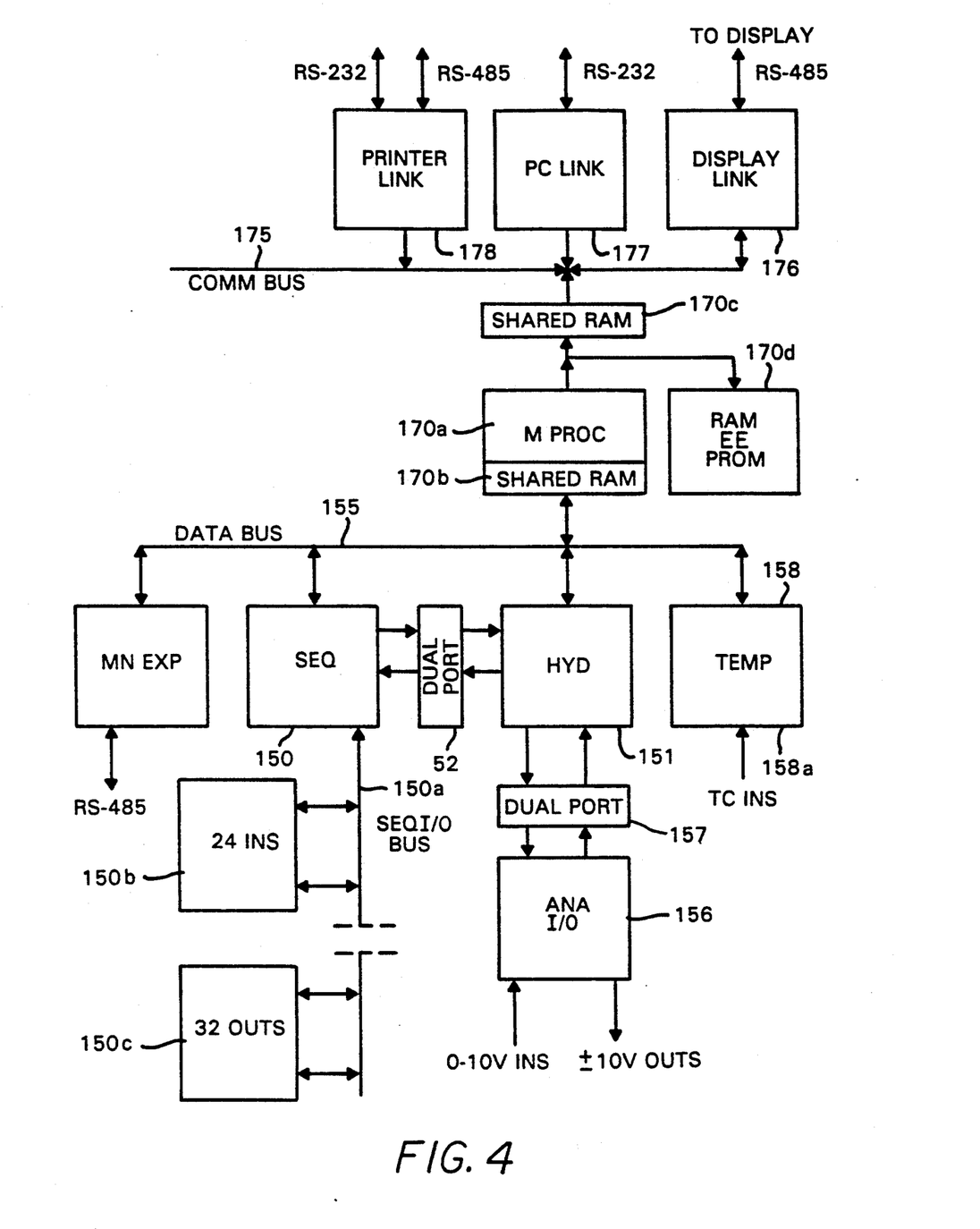
FIG. 4 is a diagram, similar to FIG. 3, and further illustrating the relationship between the data handler, the data bus, and the communication bus.

FIG. 4 is a diagram similar to FIG. 3 but emphasizing the data paths and ignoring the control paths between the modules of the machine controller. For orientation, it is seen in FIG. 4 that the data bus 155 appears near the center of the drawing and the communication bus 175 in the upper half. The data handler 170 is illustrated as a microprocessor 170a having a shared memory section 170b for communication with the data bus 155. A further shared memory 170c is connected to the output of the microprocessor 170a for transferring data to the communication bus 175. Memory associated with the microprocessor 170a includes memory 170d in the form of RAM, and E²PROM both connected to the microprocessor data bus. In addition to the standard program for driving the data handler, and intermediate storage for temporary results, the memory 170d also provides for storage of recipes communicated from the display for operation in the machine controller.

FIG. 4 shows the sequence control module 150 and a series of inputs and outputs connected thereto on a sequencer input/output bus 150a. A group of 24 sequence inputs 150b are provided, and a group of 32 sequence outputs 150c are also provided. The inputs and outputs can serve in the nature of control relays for accomplishing particular machine functions. The dual port memory 152 is also shown as coupling data between the sequencer 150 and the hydraulic control module 151. The analog inputs 156 and associated communicating dual port memory 157 are also illustrated in FIG. 4. The temperature controller 158 is shown as having a plurality of temperature control inputs 158a which can be coupled to the internal data bus 155 by the temperature controller 158.

The communication bus 175 carries data to the display link 176. FIG. 4 shows that the display link 176, in the preferred embodiment, uses RS 485 communication to the display/operator interface. The interface 177 is shown as a PC link using RS 232 communications. The interface 178, having both RS 232 and RS 485 communications is shown as a printer link. Data can be selectively transferred to any of those links from the communication bus 175 for communication with the externally connected device. Of particular significance for the present invention is, of course, the display link 176 which is serviced by the data handler 170 in such a way that the display itself acts as a real time control for the injection molding machine. As will become more apparent, that control encompasses machine control keys (or pushbuttons) on the interface which emulate the pushbutton machine control of a prior day. Thus, for example, if one of the pushbuttons on the control panel is a purge button, for example, the machine will be engaged in that mode for so long as the operator holds his finger on the button, and will immediately cease purging as soon as the operator removes his finger. This is very much like the pushbutton control provided in the days prior to computers. However, as will become more apparent in connection with a description of the display and operator interface, the actual signals to the controller are by way of data sensed by the processor in the display, and communicated via the link 176 to the communication bus 175, and thence via the data handler 170 to the internal data bus 155 from which the information is detected, analyzed and processed to ultimately drive the appropriate functions of the machine.

Figure 5:
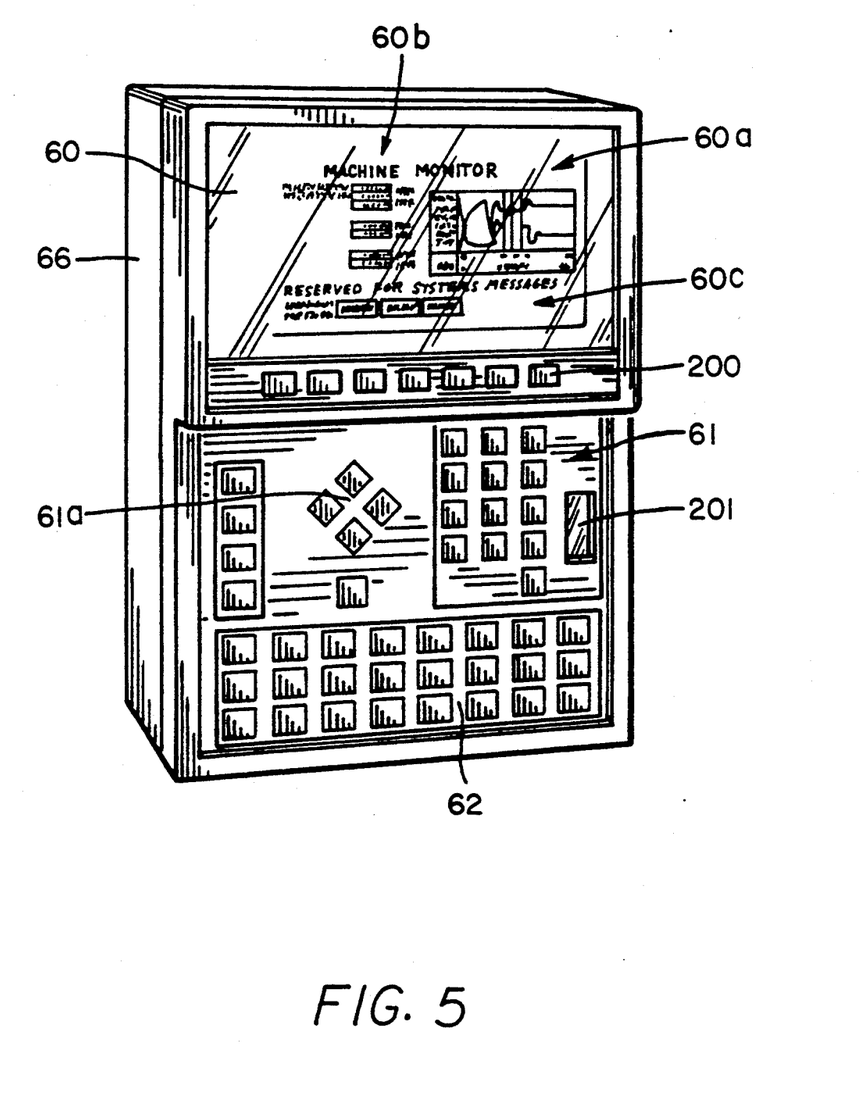
FIG. 5 is a drawing illustrating the display/operator interface including a flat panel display, programming keypad and machine control keypad.

Turning then to FIG. 5, there is shown the display and operator interface itself, and the mechanical configuration illustrated in FIG. 5 will further illustrate the high degree of functionality attained by the instant architecture.

Turning to FIG. 5, there is shown an isometric drawing of a preferred display/operator interface 24 constructed in accordance with the present invention. FIG. 5 better illustrates the elements shown only schematically in FIG. 1 and includes a flat panel display 60, a programming keyboard 61, and a machine control keyboard 62. As can be appreciated from FIG. 5, the unit is in an enclosure 66 which is compact, flat and relatively unobtrusive. The enclosure is sealed and unventilated and thus is suitable for mounting the potentially hostile environment of the injection molding machine, where it is readily accessible to an operator for control of the machine. In accomplishing that aim, it is important in the preferred embodiment that the cabinet 66 does not house the relatively substantial power supply which would be required to operate all of the electrical and electronic elements in the interface. Instead, the power supply is housed elsewhere, preferably with the machine controller, and power conducted to the enclosure 66 by way of a cable (not shown in FIG. 5).

The flat panel display 60 is preferably of the electroluminescent type, and provides high resolution for composite display of a substantial quantity of information on a single screen. In the past, using the typical CRT-type displays, numerous screens would be necessary in order to control the injection molding process, oftentimes 20 or more screens being required. A similar amount of interrelated information can be shown on only 6 screens using the present invention.

The electroluminescent display 60 of the present invention preferably has a resolution of at least 640×200 pixels, with the pixels being individually addressable, so that both alphanumerics and graphics can be displayed. The character generator or a file of downloadable character sets is also useful in the system for displaying foreign characters, such as kanji characters.

As shown in FIG. 5, the upper right-hand portion 60a of the display shows graphical information relating to the process then being run. Various parameters, such as temperatures, pressures, positions and the like can be plotted versus time across the injection molding cycle.

The plot can include both desired or setpoint values as well as actual values measured during the operation of the machine. The right-hand portion 60b illustrates the display of particular machine parameters. The parameters can be displayed in one format, i.e., black on white when they are measured values, or in reverse mode; for example, when they are setpoint values. The lower portion 60c of the electroluminescent screen 60 shows indicators for an array of soft keys 200 mounted just below the display. The indicators for the soft keys will obviously change from screen to screen.

The programming portion of the keypad 61 has a standard numeric keypad, enter, clear, backspace keys, as well as a set of cursor keys 61a for moving a cursor around on the display 60. The keypad can be used for changing screens, entering recipes, calling up additional recipes, inserting alphanumeric messages on the screen, and the like. The manner in which that is done is not important to the present invention. Suffice it to say for the moment that the keys, along with user interface software, will allow the response of the processor within the system to display messages or call up subroutines all as demanded by a particular series of key actuations.

A significant auxiliary feature of the interface of FIG. 5 is a slot 201 in the programming keypad which allows the insertion of an external memory storage device which contains one or more recipes for operation of the associated injection molding machine. Thus, a cartridge compatible with the system is inserted in the slot 201 and thereby makes available to the internal display processor information with respect to various stored recipes. The keypad 61 is then utilized to select a particular recipe for operation of the machine. The recipe can call up particular displays on the flat panel 60 as well as direct messages to the machine controller for operation thereof.

In practicing a further aspect of the invention, the machine control keypad 62 is provided for emulating hardwired control of the machine. An array of keys in the keypad 62 can be assigned to various machine functions. The assignment is made via software by interaction of the operator and the processor within the interface, and secondly, visually by associating affixable labels with the individual keys within the array 62. The arrays are preferably also associated with program controlled light-emitting diodes so that the system can signal the performance of particular functions. For example, some of the keys can be programmed as momentary depression keys, and the associated LED will be programmed to be on only when the key is held in. Others can be programmed as toggle keys so that one depression actuates the function and a second depression of the key releases it. In those cases, the LED programming will cause illumination whenever the function is actuated.

As will become more apparent, the information associated with the machine control keys 62 is sensed by the display processor and configured in a data message transmitted to the machine controller. Thus, the keys 62 do not control the machine directly, as by switching power directly to the associated elements. Quite to the contrary, the key actuations are sensed by the internal processor, the processor prepares a message responsive to the programmed function of that key, the message is transmitted to the controller, the controller decodes the message, and then drives the injection molding machine accordingly. However, the action is so fast that the keys within the control keypad 62 act very much like standard machine control pushbuttons, and emulate to the operator the actual control of the machine by way of standard pushbutton functions.

Figure 6:
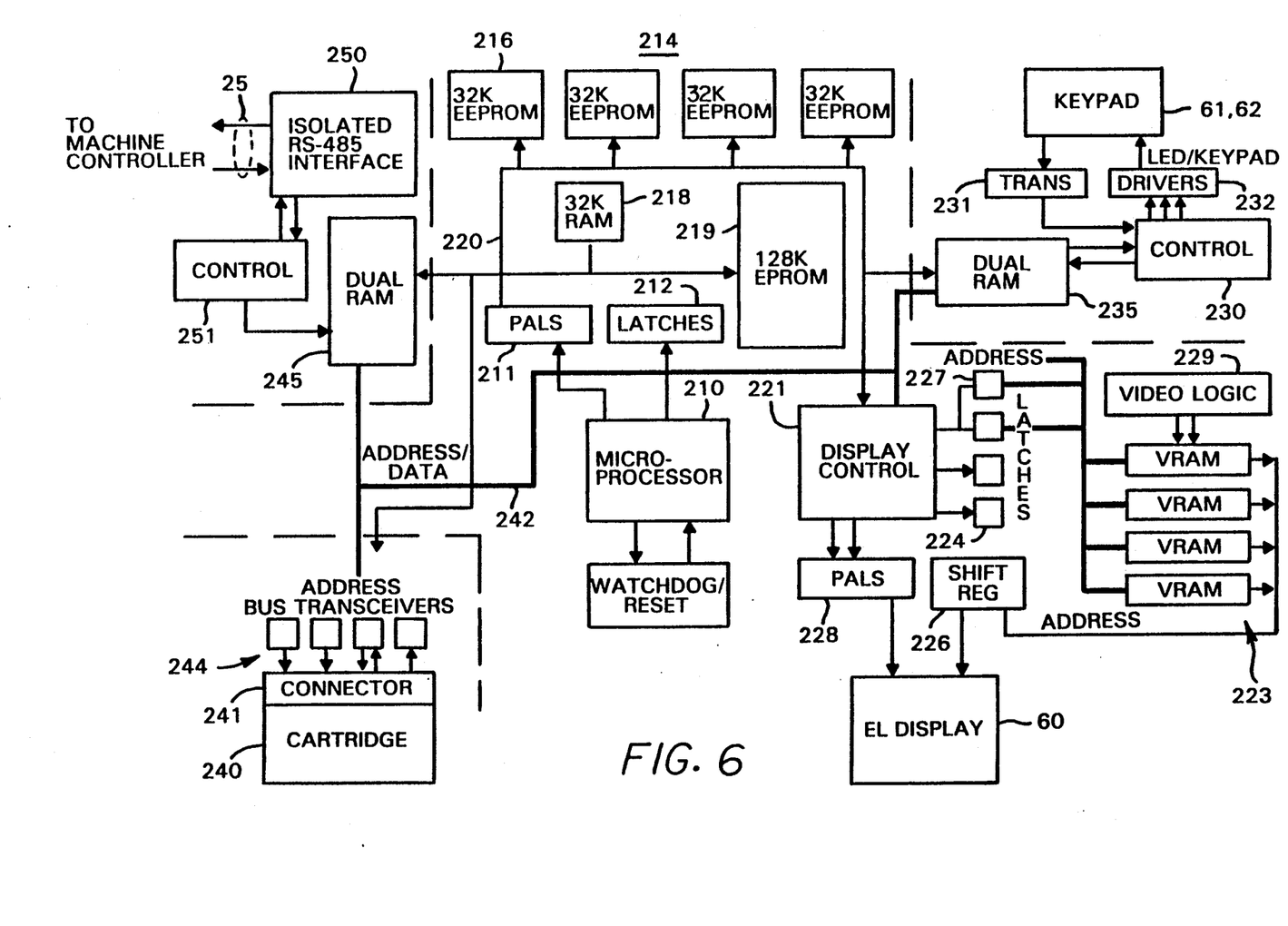
FIG. 6 is a block diagram illustrating the functional components of the display of FIG. 5.

FIG. 6 illustrates a block diagram for the functional elements contained in the enclosure 66 of the display/operator interface 24 of FIG. 5. The unit is based on a central microprocessor 210 which operates through a programmable logic interface 211 and a series of latches 212 to address a memory array generally indicated at 214. The memory array includes a group 216 of $E^2PROM$'s addressable through the interface 211, a section 218 of RAM for scratchpad memory and an additional section 219 of $E^2PROM$ for configuration memory, special characters, and the like. It is seen that the data bus 220, which connects to the memories also connects to the display controller 221. The display controller 221 then operates through a series of latches 222 which control the enabling of a bank of video RAM's (VRAM's) 223 and a further series of latches 224 which address those VRAM's. The information out of the VRAM's is passed through a shift register 226 and thence to the electroluminescent display 60. A further array of programmable array logic elements 228 is responsible to the output of the display controller 221 for addressing the individual pixels on the electroluminescent display as the data is shifted out of the register 226. Video control logic 229 also operates in conjunction with the VRAM's 223.

Thus, when the central microprocessor 210 decides to display a message, it functions according to the program stored in the memory array 216 to couple information onto the bus 220 which in turn drives the display controller 221 to act through its associated elements to display the appropriate information on the electroluminescent display 60.

Input information originating from the operator comes from the keypad 61, 62 which operates through a controller 230. The controller 230 scans the keyboard by way of an interface 231 and also controls the driving of LED's in the machine function portion of the keyboard by way of drivers 232. Information between the keypad controller 230 and the other processors in the display interface is accomplished via the dual port RAM 235 which can read or written from the keyboard controller 230, as well as from the central microprocessor 210.

The lower left portion of FIG. 6 illustrates the external programming cartridge 240 which can be inserted in a connector 241 for inputting recipe-type information into the system. It is seen that a primary address data bus 242 is connected to an array of bus transceivers 244 which receive information from the cartridge 240 and thereupon impose that information on the bus 242. The address and data information can be loaded under the control of processor 210 into the appropriate locations in memory. Such loading can also be accomplished by virtue of the connection of the bus 242 to the dual port RAM 245 which has one port connected to the main address data bus 242 and a second port connected to the scratchpad memory 218.

In order to communicate with the machine controller, the system includes an RS 485 interface 250 operated by a controller 251 and receiving information via the dual port RAM 245. Thus, information in the memory array 214 or from other areas of the system (such as the cartridge 240) can be input to dual port RAM 245 for readout through the interface 250 to the machine controller which is disposed at the other end of communication path 25. As has been described in detail above, the standardized messages which are communicated along path 25 are the basic means for conveying information between the display/operator interface of FIG. 6 and the machine controller described above. It will now be apparent that such communication is under the direct control of controller 251, using information loaded into the communication dual port memory 245 under the control of the central processor 210 of the display unit. Thus, the display unit configures the appropriate message, loads that message into the dual port RAM, and the controller 251 outputs the message according to the communication protocol. Similarly, when a message is to be received from the machine controller (such as reporting actual operating conditions in the machine), the communication receipt is under the control of controller 251, with the information being loaded by way of the interface 250 into the dual port RAM 245 for further processing and interpretation by the microprocessor 210, and possible display on the electroluminescent display utilizing display controller 221.

Figure 7:
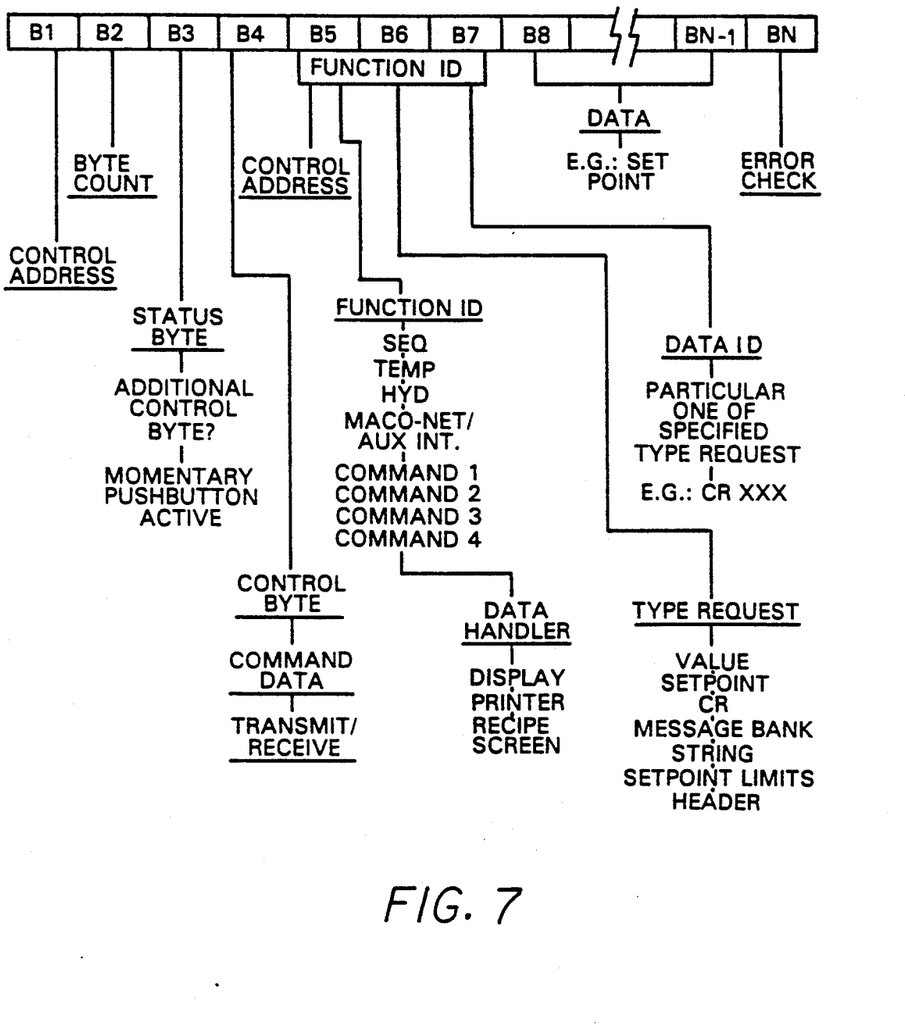
FIG. 7 is a diagram illustrating the structure of a digital message utilized for communication between the machine controller and the operator/display interface of the system of FIG. 1.

FIG. 7 provides additional information on the nature of the messages communicated between the display/operator interface 24 and the machine controller 22. It was noted above that each element of information, be it a setpoint or other operating parameter, is provided with its own functional identification, hereinafter function ID or FID. That is important in providing a relatively universal system in which the recipes can be transferred from one machine to another, from one display to another, and the like. In many prior art systems, the recipe is simply a series of setpoints, and the position of a setpoint within the recipe is intelligence-bearing. Thus, if both the transmitting and receiving systems do not know the nature of the setpoint based on its position in the data stream, it is not possible for one unit to interpret information from another.

In accordance with the invention, each of the operating parameters has its own FID associated therewith, so that the system, by reliance on the function ID can interpret the parameter for what it is intended to be. Thus, a recipe configured on one machine can be used in another machine. This is particularly useful in the cartridge-type application where it is possible to transfer cartridges between machines, and it is possible to write new cartridges for use on one or more different machines. That provides for a high degree of flexibility within an environment using injection molding machines of various manufacturers, types and vintages, with the primary necessity that day being to produce a molded part.

FIG. 7 illustrates the structure of data words communicated on the communication channel 25 (FIG. 1) coupling the interface 250 (FIG. 6) of the operator/display interface and the communication interface 176 (FIG. 3) of the machine controller. Preferably, the information utilizes a standard RS 485 format and is communicated at 375 kbaud. In the illustrated embodiment, the bytes are 8 bits in length. It will be apparent that the information in the various bytes can be interchanged, altered and the like, or other word sizes can be used. However, the important feature to note is the relatively complete identification of the data which is transmitted between the units such that the units can be designed independently and can operate almost independently but to accomplish the same goals, with the primary means of tying the units together being the structure of the data word communicated between the two.

Turning to FIG. 7, a first byte label B1 in the illustrated embodiment is used as a control address. This can identify the sending or receiving unit, for example. The second byte, identified as B2, is the byte count to identify the number of bytes in the message. In an exemplary implementation of the system, a maximum of 64 bytes comprises a message. Byte 3 identified as B3 is used as the status byte. One of the bits in the status byte can indicate whether or not there is an additional control byte. Another bit within byte B3 can indicate whether or not a momentary pushbutton (array 62 of the display/operator interface) is active. Thus, when the particular momentary pushbutton bit within the status byte B3 indicates an active pushbutton, the systems know that the operator is intending to manually control the machine, and action will be taken accordingly.

Byte B4 is used as the primary control byte. It can indicate, for example, whether the information is command or data by the setting of one bit. Another bit can indicate whether it is transmit or receive data. Other bits can be used for byte count for the control (as opposed to the data).

In practicing the invention, the following three bytes, B5-B7, are used as the function ID. The function ID can be divided up in a number of ways. In an exemplary embodiment, the first two bits of the first byte B5 are used as a control address. The next six bits, i.e., the remainder of byte B5, are used as the function ID itself. Within the combinations specified by those bits, the information can be identified as related to the sequencer, the temperature control, the hydraulic control, to network transmission, to communication on any of the given communication channels, to the data handler, to the display, and to other areas as specified. Additional information which is contained within the function ID bits of the status byte are whether or not the information is a graphical file for the printer, a text file for the printer, a recipe file, a screen file, a configuration file, an auxiliary interrupt file, a message file, a key word file, and the like. In the case of files, multiple transmissions of messages may be necessary, and the function ID will specify that the transmission is partial, and requires additional transmissions to complete. Thus, within the function ID bits of the status bytes, the nature of the information which will follow is specified in great detail. The first half of the second byte B6 of the function ID is utilized to specify the type of request. As shown in FIG. 7, that indicates whether the information will be a value, a setpoint, a control relay, a message bank, a string, setpoint limits, header, etc. The remainder of byte B6 and byte B7 are used for a data identification. Thus, for the type of request, say, a setpoint, the remainder of byte B6 and byte B7 then specify the particular setpoint. The following bytes beginning with byte B8 and through as many bytes as is required, specify the data for that particular function. The message then ends with an error check byte identified as BN in FIG. 7.

As an example, for a particular message, byte B might be set at 01 (hexadecimal) to identify a particular address, and byte B2 (the status count) as 08. The status byte might be set to 00, and the primary control byte to 06 (hexadecimal). The function ID is set to 4110FF (hexadecimal) indicating a particular control address, and a setpoint set to a sequence control function. The setpoint number (byte B7) could then be set to 01, and byte B8 identifying the particular setpoint to 001. The error check byte would then be set for appropriate parity.

Focusing on the function control bytes B5–B7, it will be seen that when information is to be routed to the display, the appropriate control address is established in the first two bits of byte B5, and the information set into the remainder of B5 which indicates that the display is intended and, for example, a setpoint is to be set. Byte B7 then identifies the particular setpoint, and bytes B8 specify the information to be set in that setpoint. When the message is communicated from the machine controller to the display, it is interpreted by the display relying on the function ID to strip out the information for the particular setpoint, to respond to its own program (within the elements shown in FIG. 6) to identify which setpoint is being altered, and what to do with that altered setpoint (for example, display it).

Figure 8:
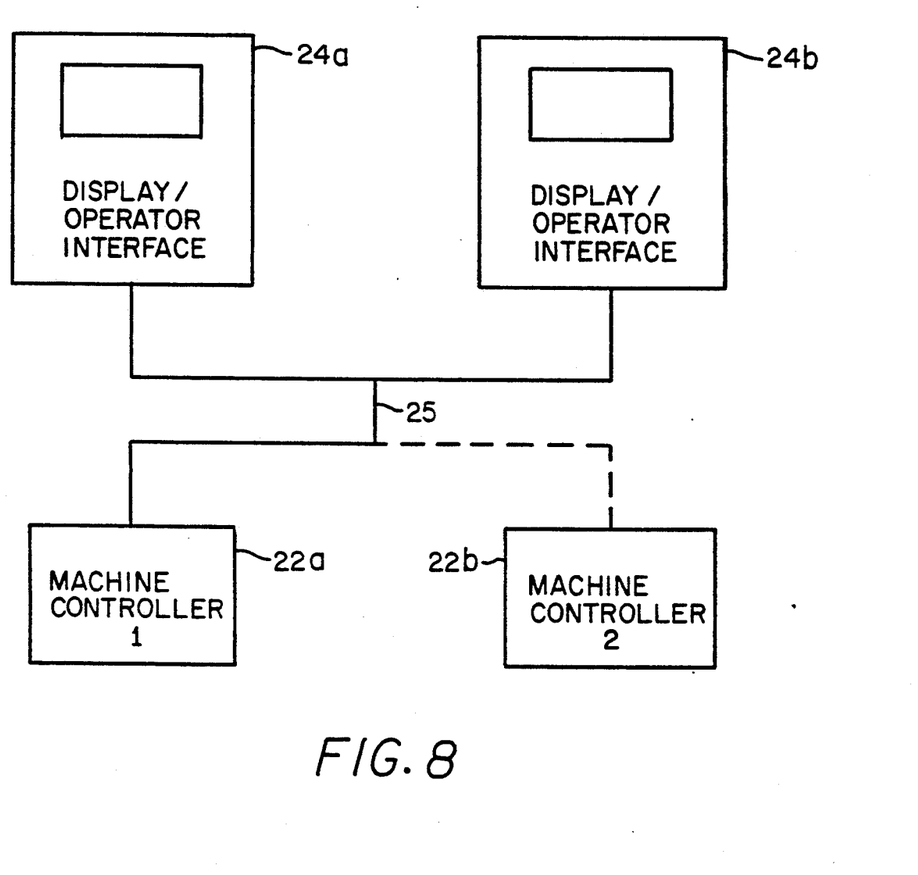
FIG. 8 is a diagram illustrating the multiple machine and multiple display aspects of the present invention.

The standardized format of the messages conveyed between the machine controller and the operator interface/display, and the function ID information associated with those messages, makes possible flexibility of operation in which multiple operator interfaces can be utilized to drive the same process machine, or a single display/operator interface can be used to control multiple process machines. As noted above, communication is on a standard bus using the RS 485 protocol, and each display 24 and machine controller 22 have their own unique address or functional ID. Turning to FIG. 8, there are shown a pair of displays 24a, 24b, both connected to a common communication channel 25. The solid line showing of FIG. 8 shows the communication bus 25 being connected to a single machine controller 22a. For purposes of this discussion, the display 24a can be considered a master, and the display 24b can be considered a slave. The dual displays can utilize the single communication channel 25 to control the machine attached to the machine controller 22a in two modes, as will now be described.

In the first mode, the second display/operator interface 24b is slaved to the master 24a. In this mode of operation, the secondary display 24b has identical information to the primary. When the operator attempts to control the system from the secondary display 24b, the primary display 24a is switched to temporarily become the secondary operator interface. The user has the ability to lock out the secondary display 24b from ever taking over the role of the master, based on the assigned security level for the system. This provides a means of permitting viewing of the parameters at the secondary display 24b without permitting modifications. When the system is configured to allow the secondary display 24b to temporarily take over the primary function, modifications to the controlled machine can occur from two different locations without affecting the update rates for the respective displays 24a, 24b, since the second display is slave to the first, and both will be displaying the same information.

As a second mode of operation, the two displays are allowed to function completely independently of each other, including the display of different information. In that case, assuming a given transmission rate on the communication channel 25, the update of the respective displays 24a, 24b will be at only half the rate of the master/slave operation discussed just above. The primary operator interface 24a communicates to the machine controller 22a first, and the secondary operator interface communicates after completion of the first transmission. The primary display 24a permits the secondary display 24b the opportunity to request information or change parameters within the control 22a. The interfaces 24a, 24b are not slaved to each other in this mode, but the independent operation is at the rate of throughput, since the displays must be updated completely independently.

In operation, the primary display 24a on power-up determines what other devices are present on the communication link. This is accomplished by an echo address command. Once the number of devices on the communication link 25 has been established, the primary device 24a determines the power-up data from the system. This determines which mode of operation has been selected (slaved or independent). Since each control has its own unique address, it is not affected by the number of operator stations currently utilized, nor does the mode of operation affect the control system.

More particularly, the FIG. 8 includes a dashed line illustration of a second machine controller 22b, also connected to the single communication link 25. Since each machine controller 22a, 22b has its own unique address, the number of operator stations connected to the bus has no effect on the operation of the machine controller.

When utilizing one or more displays to control two or more machine controllers 22a, 22b as suggested in FIG. 8, the operator interface/display 24 will be provided with information (via the recipe, the power-up sequence, or an initial selection made by the operator), as to which machine control it is communicating to at that particular time, and the appropriate address will be inserted into each message communicated on the bus 25 to assure that the information is being communicated to the proper machine controller, and thus is controlling the proper machine. When the operator desires to switch the interface to control the second machine, the interface 24 will thereupon alter the address of the machine controller 22 within any data messages it sends, so that new messages will be routed to the new machine to be controlled.

Returning to recipe operation, and considering again the simple case of a single operator interface and single machine controller, when a recipe is entered at the display station, it will be appreciated that the recipe can be entered either manually by operating the programming keypads, or automatically, by inserting a cartridge. The recipe will include a sequence of words (which usually requires multiple transmissions for transfer to the controller), the words being much like those illustrated in FIG. 7 which identify particular control relays, setpoints, temperatures, sequence control functions, and the like, which must be activated, altered or controlled in order to cause the injection molding machine to carry out that recipe. Referring to FIG. 6, the information, initially entered on the cartridge 240, is passed to the data bus 242 under the control of the processor 210 for storage in the system, such as in the scratch pad memory 218. When the information is interpreted, the processor 210 will then determine what information is to be sent to the machine controller in order to cause the performance of the recipe. Appropriate message will be formatted and communicated through dual port ram 245 to the controller 251, which will then transmit a sequence of messages such as illustrated in FIG. 7 to the machine controller.

The machine controller is illustrated in FIG. 4. The information will be received on the display link 176 and imposed on the communication bus 175. The shared RAM 170c will then be utilized under the control of processor 170a to receive the information, do a partial interpretation, and impose the partially interpreted information on the main data bus 155. The individual processors associated with that data bus will then interpret the appropriate information and ultimately will generate signals which are output to the injection molding machine (for example, through the elements 150b, 150c) for control of the machine. Setpoint signals will be taken back, such as through input 158a, sensed by the controller 158, transmitted to the data bus 155, via the data handler 170 to the communication bus 175, via the display link 176 to the communication link 25. When the information is received at the display (FIG. 6), it is received under the control of controller 251, communicated via RAM 245 to the memory, and interpreted by the processor 210. If it is information for display, the display controller 221 will be involved in extracting the appropriate information and driving the display to ultimately show that information on the display screen 60.

It will be appreciated that during the course of that transmission, the other processors within the respective systems are all performing their independent functions. The primary commonality between the interface and the machine controller are that, in the end, the setpoints, limits and the like to which both respond are the same. The manner in which they respond can be entirely different. The manner in which they communicate is specified only insofar as the nature of the data message transmitted between the two. Thus, it will be apparent that the units are, insofar as the designer is concerned, substantially independent separate design problems. However, insofar as the user is concerned, the display acts as an extension of the machine interface to provide the standard form of control to which he has become accustomed.

What is claimed is:

1. A display and control architecture for a process machine comprising the combination of:
    a machine controller configured to control operating parameters of the process machine, the machine controller having: outputs connected to the process machine for control thereof, a processor having a data bus and a communication bus, and a data handler for controlling the passing of data between the communication bus and the data bus;
    a display/operator interface having: an enclosure separate from the machine controller, a display, a keyboard and a display processor within the enclosure, a program for the display processor rendering the display/operator interface operative as interface means for providing (a) input of parameters for control of the process machine, (b) display of such input parameters, and (c) display of operating parameters sensed from the process machine, a communication bus for the display processor; and
    a communication link coupling the communication buses and comprising the only means of communicating data between the display processor and the machine controller processor, the communication link carrying data messages having a predetermined format recognizable by the display processor and the machine controller processor and allowing decoupling of such processors for independent operation but for communication using messages on the communication link.

2. The combination as set forth in claim 1 further including a plurality of operator accessible machine control switches on the enclosure of the display/operator interface, the display processor including means for scanning the switches to sense the condition thereof and to communicate on the communication link the condition or changed condition of said such switches for response thereto by the machine controller.

3. The combination as set forth in claim 2 further including a power supply for supplying power to the display/operator interface, the power supply being mounted remotely from the display/operator interface, the display/operator interface enclosure being sealed and unventilated for mounting in a potentially hostile environment at the injection molding machine.

4. The combination as set forth in claim 3 wherein the power supply is mounted in a cabinet housing the machine controller.

5. The combination as set forth in claim 4 further including means in the enclosure of the display/operator interface for storing a program comprising a recipe for operation of the process machine, means associated with the display processor for assigning a function ID to each setpoint or parameter of the recipe which relates to control of the process machine, and means transmitting the function ID, setpoints and parameters on the communication bus to the machine controller processor for operation of the process machine in accordance with the recipe input to the display processor.

6. The combination as set forth in claim 1 further including means in the enclosure of the display/operator interface for storing a program comprising a recipe for operation of the process machine, means associated with the display processor for assigning a function ID to each setpoint or parameter of the recipe which relates to control of the process machine, and means transmitting the function ID, setpoints and parameters on the communication bus to the machine controller processor for operation of the process machine in accordance with the recipe input to the display processor.

7. The combination as set forth in claim 1 in which the display and control architecture further comprises a plurality of display/operator interfaces, each coupled to the machine controller by the communication link for providing multiple operator interfaces for the process machine.

8. The combination as set forth in claim 1 wherein the display and control architecture includes a plurality of machine controllers each associated with a separate process machine, a single display/operator interface having a communication link to all of said machine controllers whereby a single display/operator interface is adapted for control of process machines.

9. In a process machine system having a programmed machine controller for operating the machine, a display/operator interface, the system being adapted for operation according to a plurality of preprogrammed recipes which set the operating parameters for the machine, a display and control architecture comprising the combination of:
    a machine controller in a first enclosure and configured to control the machine operating parameters to establish operating cycles for the machine, the machine controller having: outputs connected to the process machine for control thereof, a processor having an internal data bus and a communication link for communicating data related to the operating parameters of the machine, and a data handler for controlling the passage of data between the data bus and the communication bus;

a display/operator interface in a second enclosure and comprising: a display, a programming keypad, and a display processor; the aforementioned elements being enclosed in a reasonably flat compact display enclosure adapted for mounting in a potentially hostile environment on the process machine;

the display/operator interface also including means for storing a plurality of preprogrammed recipes for control of the process machine to produce different parts according to different recipes, the recipe including a plurality of sequenced setpoints and other operating parameters necessary to make the associated part, means associating a function ID with each setpoint or other operating parameter, and means for configuring data messages on the communication link for transmitting the setpoints and other operating parameters with associated function ID's to the machine controller;

the processor in the machine controller including means for recognizing the function ID to route the setpoints or other process parameters to the process machine for operation thereof according to the preprogrammed recipe.

10. The combination as set forth in claim 9 wherein the display/operator interface includes means for selectively actuating the respective recipes for control of the process machine.

11. The combination as set forth in claim 9 wherein the display/operator interface further includes a machine control keypad, the processor in the display/operator interface including means for responding to actuation of the machine control keypad to send a data message on the communication link to the machine controller which simulates an operator override of the recipe then being executed.

12. In a process machine system having a programmed machine controller for operating the machine, a display/operator interface, the system being adapted for operation according to a plurality of preprogrammed recipes which set the operating parameters for the machine, a display and control architecture comprising the combination of:

a machine controller in a first enclosure and configured to control the machine operating parameters to establish operating cycles for the machine, the machine controller having: outputs connected to the process machine for control thereof, a processor having an internal data bus and a communication bus for communicating data related to the operating parameters of the machine, and a data handler for controlling the passage of data between the data bus and the communication bus;

a display/operator interface in a second enclosure and comprising: a display, a programming keypad, a machine control keypad, and a display processor; the aforementioned elements being enclosed in a reasonably flat compact display enclosure adapted for mounting in a potentially hostile environment on the process machine;

a remote power supply for the display/operator interface adapted for mounting remote from the second enclosure so that the heat generated by the power supply is not dissipated within the second enclosure;

cable means including a communication link from the display processor to the communication bus of the machine controller processor, and a power link for coupling operating power from the power supply to the display/operator interface;

the display processor in the display/operator interface including means for:
(a) operating in conjunction with the programming keypad and the display for storing recipes including setpoints and machine control parameters, and
(b) upon selection of a particular recipe for transmitting on the communication link to the machine controller the parameters necessary for effecting the selected recipe.

13. The combination as set forth in claim 12 in which the display processor includes means for responding to actuations of the machine control keypad to impose data messages on the communication link for transmission to the machine controller processor to simulate direct control of the process machine from the machine control keypad.

14. The combination as set forth in claim 12 in which the power supply is housed in the first enclosure with the machine controller, and the second enclosure is a non-ventilated enclosure sealed against said potentially hostile environment.

15. The combination as set forth in claim 12 in which the communication link is adapted to carry data messages of standardized format between the processors in the display/operator interface and the machine controller, said processors being otherwise decoupled for independent operation according to independent programs linked only by the data conveyed in said standardized messages.

16. The combination as set forth in claim 15 in which the display/operator interface includes means for receiving an external storage device containing at least one operating recipe, the display/operator interface including means for assigning a functional ID to each setpoint or parameter of the recipe, and means associated with the processor of the machine controller for recognizing the functional ID and associating the setpoint or parameter with a machine operating parameter for control of the process machine according to the stored recipe.

17. The combination as set forth in claim 12 in which the display/operator interface includes means for receiving an external storage device containing at least one operating recipe, the display/operator interface including means for assigning a functional ID to each setpoint or parameter of the recipe, and means associated with the processor of the machine controller for recognizing the functional ID and associating the setpoint or parameter with a machine operating parameter for control of the process machine according to the stored recipe.

18. The combination as set forth in claim 12 in which the display processor includes means for extracting from the communication bus data relating to actual operating parameters in the injection molding machine, and means for driving the display to display the actual machine operating parameters.

* * * * *